(No Model.)

W. H. WRIGHT.
MACHINE FOR MAKING BALLS.

No. 439,715. Patented Nov. 4, 1890.

Witnesses,
Cora J. Blakeley.
Harriet Johnson

William H. Wright, Inventor.
By James Sangster
Attorney.

UNITED STATES PATENT OFFICE.

WILLIAM H. WRIGHT, OF BUFFALO, NEW YORK.

MACHINE FOR MAKING BALLS.

SPECIFICATION forming part of Letters Patent No. 439,715, dated November 4, 1890.

Application filed June 16, 1890. Serial No. 355,585. (No model.)

*To all whom it may concern:*

Be it known that I, WILLIAM H. WRIGHT, a citizen of the United States, residing in Buffalo, in the county of Erie and State of New York, have invented certain new and useful Improvements in Machines for Making Balls, of which the following is a specification.

My invention consists in certain improvements whereby the machine is rendered more perfect in its operation, a greater quantity of balls are ground to a practically-true sphere in a given time, and the quality of the work much improved, all of which will be fully and clearly hereinafter described and claimed, reference being had to the accompanying drawings, in which—

Figure 1:
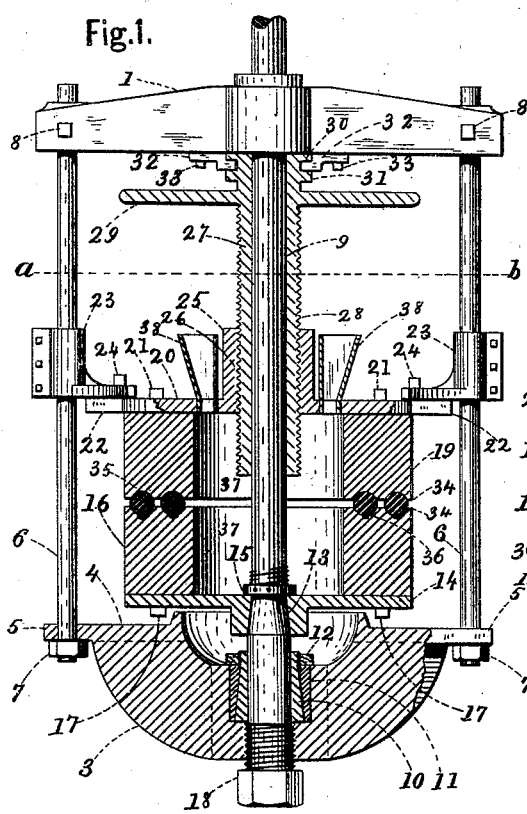
Figure 2:
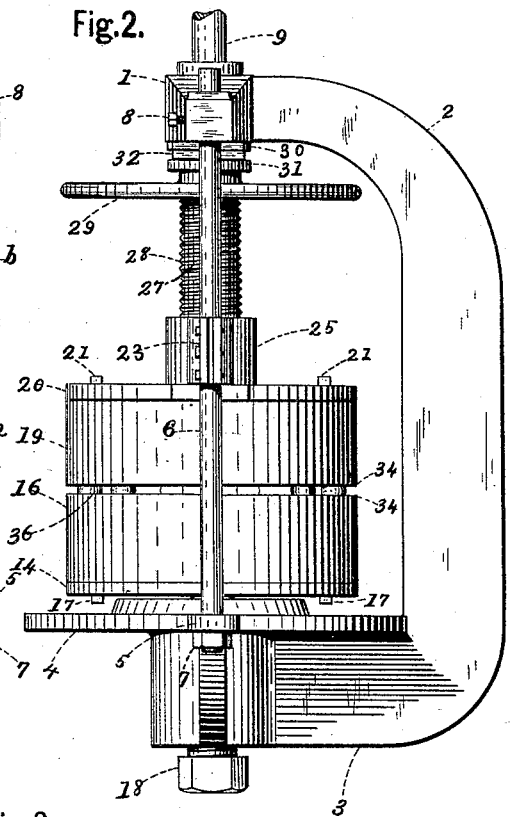
Figure 3:
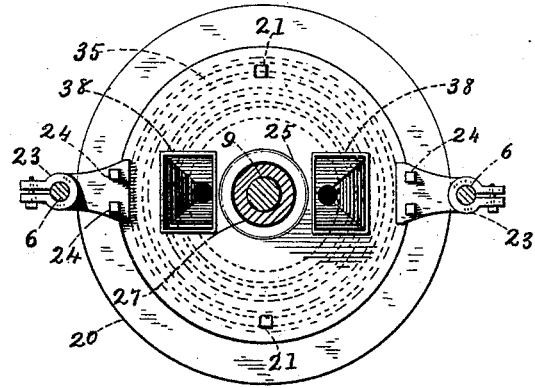

Figure 1 is a front sectional elevation; Fig. 2, a side elevation, and Fig. 3 is a horizontal section in or about line *a b*, Fig. 1.

In some of my former machines of this kind the upper disk has been made to rotate while the lower disk remained stationary. This construction is objectionable, because the emery or other grinding material as it is fed in between the disks is liable to be thrown against the sides of the central opening in the rotary disk through which it is passed, where it is held by the centrifugal force, and thus effectually prevent the grinding material from being fed between them. One of the objects of my invention is to obviate this objection.

In said drawings, 1 represents the upper portion of the frame of the machine, consisting of the cross-bar, which is rigidly secured in any well-known way, or, preferably, forming a part of the rear overhanging arm 2, which arm extends backward and then vertically downward, where it is rigidly fixed to or forms a part of the lower portion of the frame-piece 3 and disk 4. The disk 4 is provided with two oppositely-projecting portions 5, and through the opposite portions 5, and near the opposite ends of the arm or cross-bar 1, are holes located directly in a line with each other, so that the two vertical bars 6, forming the vertical side-frame pieces pass through and are either secured by nuts 7 or by the set-screws 8, substantially as shown in Figs. 1 and 2.

The vertical driving-shaft 9 is mounted and supported so as to turn in the vertical bearings, which bearings consist of the usual tapering sleeve 10, fitted in a Babbitt-metal seat 11 and provided with a nut 12, by which it is drawn up and tightened closely and centrally to this shaft 9 when required. Above the nut 12 the shaft 9 is reduced in size, so as to provide a tapering portion 13, (see Fig. 1,) over which is fitted a circular disk 14, and rigidly secured in place by a nut 15. On this disk 14 the lower grinding-disk 16 is rigidly secured by the set-screws 17, so as to rotate with the shaft 9.

At the bottom of the shaft 9, the end of which is flat, is a vertical adjusting-screw 18 for adjusting the shaft 9 and grinding-disk 16 vertically as the disk is worn away by use, or as it may be otherwise required.

The upper stationary disk 19 is secured to a flat disk 20 by screw-bolts 21, having two oppositely-projecting portions 22, to which the holding-pieces 23 are secured by screw-bolts 24. These holding-pieces 23 are made in the form of clamping-pieces, so they can be clamped closely to the bars 6 when required.

The disk 20 is provided with an upwardly-projecting tubular hub 25, having an interior screw-thread 26, and on the shaft 9 is mounted a vertical sleeve 27, having a screw-thread 28, corresponding with the screw-thread 26, so as to fit and operate therein.

The upper portion of the sleeve 27 is provided with a circular hand-wheel 29 for turning it in either direction. At the top are two surrounding ribs or collars 30 31, and between the collars are fitted at opposite sides the holding or suspending pieces 32, which project into the groove between the collars, and thus hold the sleeve from moving vertically or lengthwise in either direction, but permit it to rotate easily when required, or be moved by the hand-wheel 29 to adjust the disk vertically up or down when it is necessary to get at them for any purpose. The holding or suspending pieces 32 are securely held in place by the screw-bolts 33. (See Fig. 1.)

In the faces 34 of each of the disks 16 and 19 are one or more circular grooves 35, the grooves in each corresponding with the other, (shown by dotted lines in Fig. 3 and in section in Fig. 1,) in which the balls 36 to be ground are placed. Each grinding-disk is provided with a central circular opening 37, (shown in Fig. 1,) and the top or suspending disk 20 is provided with two holes located substantially opposite each other, in which is placed the nozzles of two funnel-shaped receptacles 38, in one of which is placed or fed the emery or any suitable grinding material, and in the other is placed or fed the water or other lubricating material.

The operation is as follows: The upper disk is raised sufficiently high by means of the hand-wheel 29 to allow the balls to be ground to be conveniently put in place in the circular grooves 35. The disk is now lowered so that the balls are inclosed, or nearly so, between the two disks. The grinding material and water are now let into the central opening 37, and when it fills up to the top of the opening in the lower disk (the lower disk being closed and rendered tight by the disk 14) the centrifugal force, caused by the rapid rotation of the disk 16, throws the grinding material and water in between the disks upon the balls. The upper disk, being stationary, is not affected by the centrifugal force. Consequently the material is free to be fed to the balls as required without any obstruction. The proper rotary motion is given to the shaft 9 and disk 16 by an ordinary pulley secured to the upper part of the shaft, and connected in any well-known way by a belt with any suitable source of power for moving it.

I claim as my invention—

1. In a machine for grinding balls, the combination therewith of an upper stationary grinding-disk mounted on the frame of the machine and having circular grinding-grooves to receive the upper portions of the balls and provided with a central opening and receptacles for holding the grinding and lubricating material, and a lower rotating disk mounted on the driving-shaft, having corresponding circular grinding-grooves and a central opening closed at the bottom to receive, hold, and distribute the grinding and lubricating material, substantially as described.

2. The combination of an upper stationary disk having grooves in which the upper portions of the balls are moved while being ground and a lower rotating disk mounted on the driving-shaft, having corresponding grooves to receive and hold the balls to be ground, each disk being provided with a central opening, receptacles for holding and feeding the grinding and lubricating material, and a means, substantially as above described, for raising or adjusting the stationary disk, for the purposes specified.

WILLIAM H. WRIGHT.

Witnesses:
JAMES SANGSTER,
CORA J. BLAKELEY.